United States Patent [19]

Tayar

[11] Patent Number: 5,480,205
[45] Date of Patent: Jan. 2, 1996

[54] LOADING BOW DEVICE FOR OPEN TENDERS

[76] Inventor: Eli Tayar, c/o Masgeriat Tal, Tel Josef 19132, Israel

[21] Appl. No.: 321,759

[22] Filed: Oct. 12, 1994

[51] Int. Cl.[6] ....................................................... B60P 3/00
[52] U.S. Cl. .................................. 296/3; 224/405
[58] Field of Search ................... 296/3, 26; 224/42.45 R

[56] References Cited

U.S. PATENT DOCUMENTS

| | | | |
|---|---|---|---|
| 3,589,576 | 6/1971 | Rinkle | 296/3 X |
| 4,770,458 | 9/1988 | Burke et al. | 296/3 |
| 5,190,337 | 3/1993 | McDaniel | 296/3 |

Primary Examiner—Joseph D. Pape
Attorney, Agent, or Firm—Popham, Haik, Schnobrich & Kaufman, Ltd.

[57] ABSTRACT

A loading device for open tenders comprises a front bow including two fixed side bars the ends of which are inserted into a hollow rotatable bar which extends parallel to and substantially the width of the driver's cabin, which rotatable bar bears a frame sub-divided by wires. Stops in the form of box-like pans are mounted on each fixed bar, to stop the movement of the rotatable bar. The rotatable bar comprises in pan of its circumference a slot the length of which corresponds to the desired range of angular movement of the rotatable bar. The stops are located in alignment with the slot flush with the rotatable bar or higher. The fixed and rotatable bars, the frame, and the stops (or box-like pans) are connected with each other.

6 Claims, 2 Drawing Sheets

LOADING BOW DEVICE FOR OPEN TENDERS

The present invention relates to an improved loading bow device for open Tenders.

Very often it is desirable to carry on a truck objects which are longer than the open truck. From U.S. application Ser. No. 08/263,688 there is known a loading device for open Tenders. However, it has been found that said bow is not always satisfactory, since whenever a long object has to be loaded, i.e. one that extends over the driver's cabin the object may hit the top of the cabin and make the driving dangerous. Moreover, when the loaded objects are high the presence of a protecting device for the back of said cabin is highly recommended.

It has therefore been desirable to design a device which overcomes the above disadvantages, i.e. make it possible to carry safely objects extending over the top of the driver's cabin and simultaneously protects the top of the cabin. Said device should be simple to manufacture and use, should not be too expensive and should have the required properties.

In the present invention as defined and described herein "front" means the position near the drivers cabin and "back" means the position at the back side of the open Tender.

The present invention thus is an improved loading bow device for open Tenders comprising:

a. a front bow extending parallel to the width of the driver's cabin which bow comprises one fix bar at each side, the ends of said fix bars being inserted into a hollow rotatable bar extending parallel to, and substantially the width of the driver's cabin which rotatable bar bears a plate, suitable stopping means being mounted on each fixed bar to stop the movement of the rotatable bar, which front bow is connected at both lower sides by suitable connecting means to b. bars (herein called "lower bars"), each lower bar being connectable by suitable connecting means to the top of the corresponding side wall of the open truck; and c. a back bow extending parallel to the front bow, the back bow being placed at the back side of the open Tender.

It is readily understood that the term "driver's cabin" comprises also a cabin for passengers.

The back bow is, advantageously, movable, i.e. it may move along the lower bars, e.g. on rails, being connectable to said lower parts at predetermined places.

There are advantageously present also upper removable bars (herein called "upper bars"). Said upper bars extend parallel to the lower bars and are suitably connected to the top of the front and back bows and are easily removable therefrom. Said upper bars are required: A. when the back bar is not movable and B. when the object to be loaded is long.

The length of the upper and of the lower bars corresponds substantially to the length of the open part of the truck.

The lower and upper bars are preferably threaded into the front and back bows and are advantageously held therein with the aid of connecting means. The upper bars should easily be removable.

The height of the front and of the back bows may extend, e.g. from the top of the walls of the open truck up to the top of the driver's cabin and even higher.

The front and the back bows may be connected at their upper sides by suitable means to foldable stoppers, which are in turn attached to the upper bars. Said stoppers, in combination with the upper bars, stoppers prevent the sliding of the objects out of the open Tender.

The lower bars may be connected to the top of the corresponding side wall of the open truck by various means. Preferably the lower bars are connected to the side walls via some small bars which determine the height of the device and also enable the insertion of ropes for tightening the objects to the device and/or to the walls of the truck by any suitable connecting means.

Connecting means may be in all instances screws, pins, threading means, etc. The connecting means being chosen are adequate to the place where they are required.

All parts of the device according to the present invention may be made of any rigid material such as metal, e.g. steel (preferably coated), stainless steel, etc.; rigid plastic, e.g. P.V.C., etc. Said material should preferably be weather resistant and non-corrosive.

All parts may be foldable so that the device, when not being used, may be put into a box or the like.

A bow in connection with the present invention means a bar extending parallel to the width of the driver's cabin and two side bars connected the parallel bar. In the front bow said parallel bar serving as rotatable one has to be a hollow bar and the diameter of the side bars has to be a little bit smaller than the diameter of the rotatable bar.

A bar in connection with the present invention means a bar proper, a rod, a pipe or the like. The rotatable bar has to be hollow.

Each bar of the bows as well as the lower and upper bars may be comprised of small pieces which are connected to each other by suitable connecting means.

The plate is advantageously transparent. It has preferably the shape of a frame. The frame may be one part only but advantageously it will be sub-divided by several wires. The size of the plate corresponds preferably substantially to the width and to the length of the driver's cabin.

The stopping means located on the fixed bars and in alignment with a circumferential slot extending along a part of the circumference of the rotatable bar are preferably small boxes but may have any other suitable forms. Said boxes should be located either flush with the rotatable bar or should be higher than the bar so that in the desired position it can stop the rotational movement. The slot should have a length corresponding to the desired range of angular movement of the rotatable bar. The box is held by connecting means such as crews passing through the rotatable bar and, if desired, through the plate. In this case the rotatable bar is provided along a part of its circumference with a slot the movement of which is stopped by said boxes.

The device is used as follows:

The front bow is connected at its sides to the corresponding lower and upper bars and bears on its center rotatable bar the plate. Each lower bar may be connected directly or by small parts to the corresponding side wall of the open truck. When long objects, i.e. those extending over the driver's cabin have to be loaded on the open tender the back bow is fixed to the upper and lower bars at the back end of the open truck and the plate will be fixed in the open position i.e. upon the cabin. The upper bars are attached to the foldable stoppers, and the foldable stoppers are opened.

When high objects have to be loaded, i.e. the plate is in the closed position, the plate is placed near and parallel to the cabin in the protecting position. If a movable back bow is present it may be moved towards and parallel to the front bow. The upper bars have to be removed and may be put at any suitable location or fixed at the lower bars.

The rotation operation is performed as follows:

The transition of the plate from open to closed position or vice versa is achieved by rotating the rotatable bar together with the plate into the required position in the slot. It is in the required position when it is stopped by the stopping means. Then the connecting means connecting the stopping means to the fixed bars are closed. When the other position is required the connecting means are opened, the rotatable bar with the plate are rotated into the other position and there again fixed by the connecting means.

The present invention will now be illustrated with reference to the accompanying drawings, without being limited by them. Identical parts appearing in several drawings will be marked by the same numerals. In said drawings.

Figure 1:
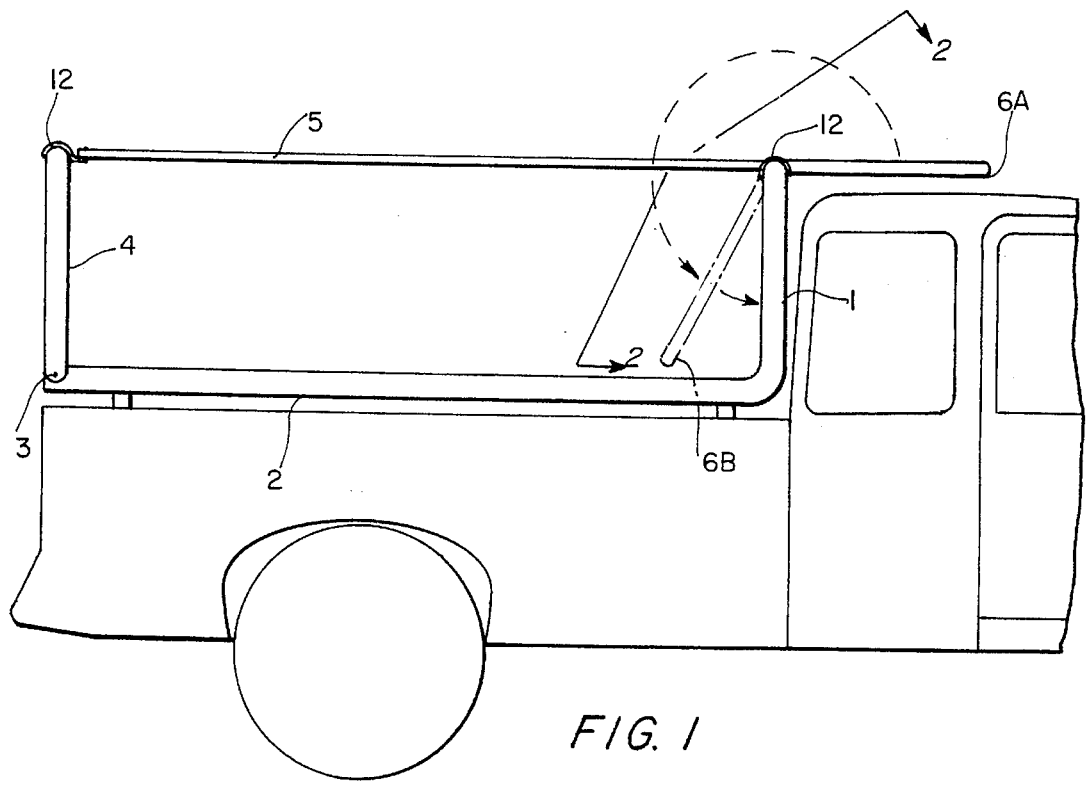
FIG. 1 shows a side view of the device according to the present invention indicating two positions of the plate.

In FIG. 1 lower bar 2 is connected to front bow 1. Lower bar 2 is also connected by connecting means 3 to back bow 4. Back bow 4 is connected by connecting means to upper bar 5 which is in turn connected by suitable connecting means to front bow 1. Frame 6 which is connected to front bow 1 is shown in two positions:

position A: in open position i.e. frame 6 extends over the cabin; and position B: in closed position i.e. frame 6 extends parallel to the cabin and to the front bow.

Figure 2:
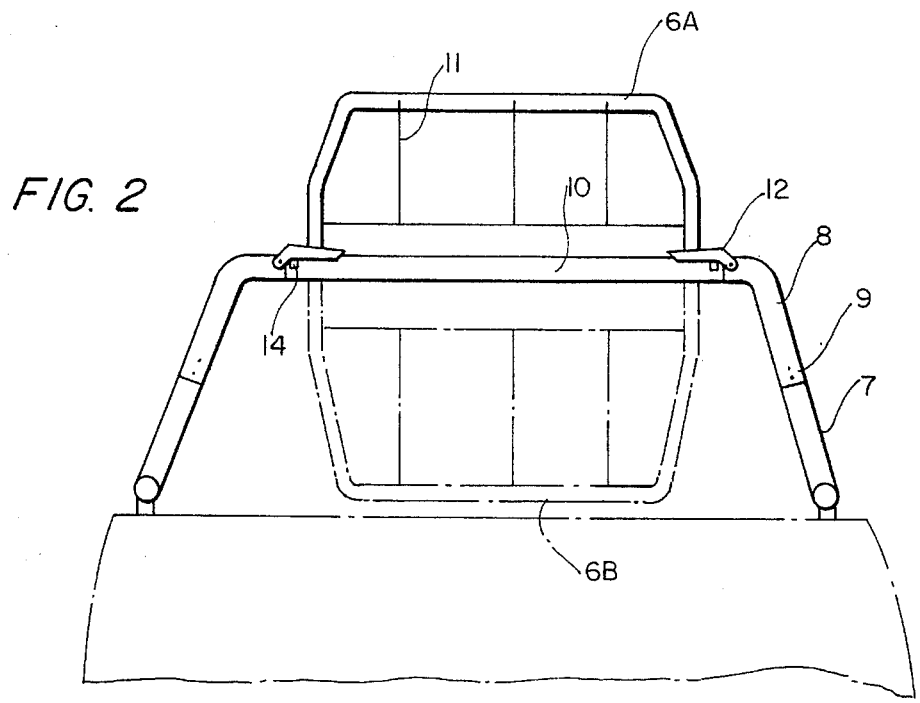
FIG. 2 shows a front view of the front bow with the plate (in two positions) of a device according to the present invention, taken along line 2—2 of FIG. 1.

Front bow 1 is shown in detail in FIG. 2. Front bow 1 comprises at each side a fixed bar which consists of two bars 7 and 8 (connected to each other by connecting means 9). Bar 8 is threaded into rotatable bar 10. Rotatable bar 10 is connected to frame 6 in the same two positions as in FIG. 1, i.e.

position A in open position; and
position B in closed position.

Frame 6 in this device comprises several wires 11. Foldable stoppers 12 are mounted on front bow 1 on fixed bars 8. As shown in FIG. 1, upper bars 5 are connected to foldable stoppers 12, so that foldable stoppers 12 connect upper bars 5 to front and back bows 1 and 2.

Figure 3:
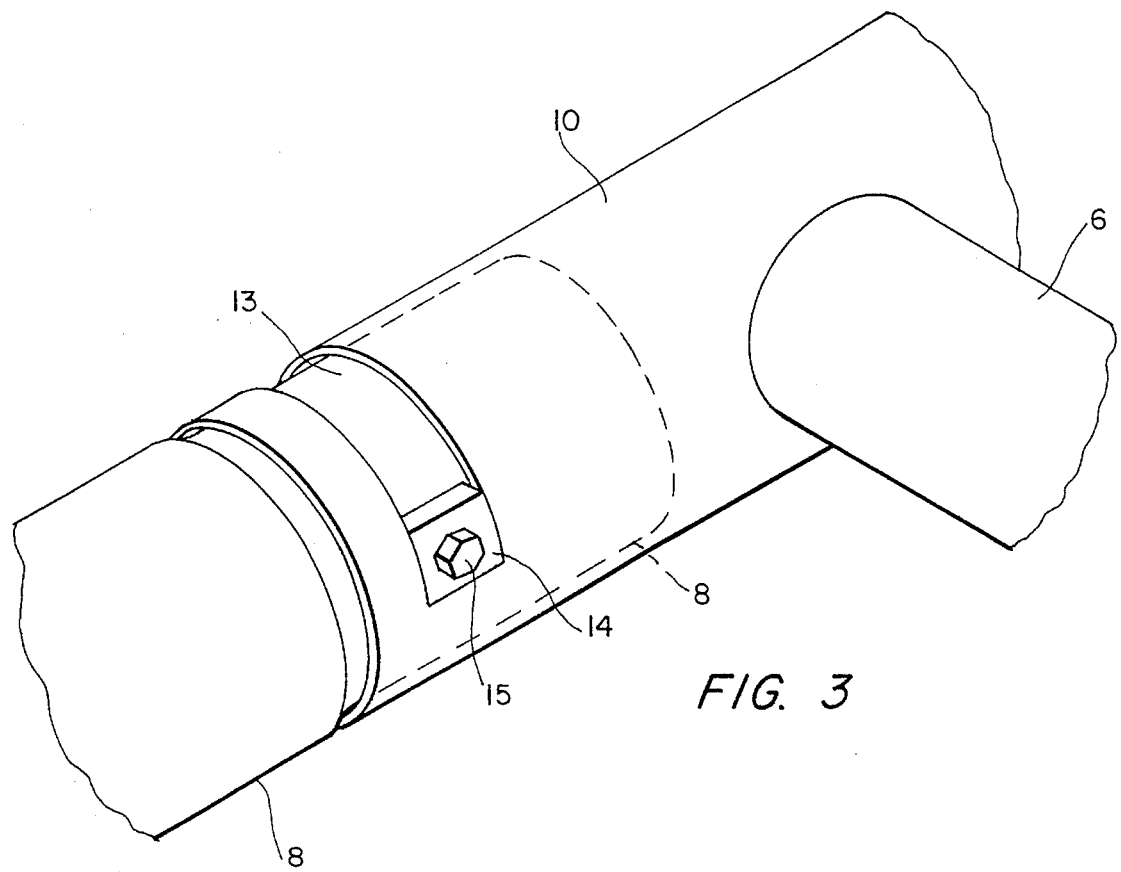
FIG. 3 shows a connection between the permanent and the rotatable bars of the front bow of a device according to the present invention.
Figure 4:
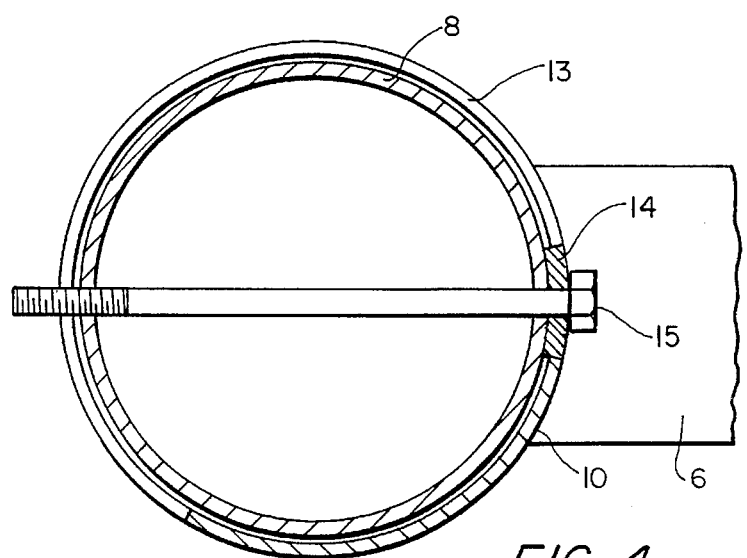
FIG. 4 shows a cross section of the connection between the fixed and rotatable bars of a device according to the present invention.

In FIG. 3 permanent bar 8 is threaded into rotatable bar 10. Rotatable bar 10 comprises aperture 13. Permanent bar 8 comprises box-like part 14 through which screw 15 passes. Screw 15 connects fixed bar, rotatable bar 10 with aperture 13, plate 6 and box-like part 14 one to another. As shown in FIG. 4, screw 15 connect, through box-like part 14, rotatable bar 10 with its aperture 13 to permanent bar 8 and plate 6. Screw 15 can be partially unscrewed (i.e., opened) to permit rotation of rotatable bar 10, and can be screwed in (closed) to limit rotation of rotatable bar 10. Also, as shown in FIG. 2, when in the closed (i.e., folded down) position, foldable stoppers 12 prevent the movement of box-like part 14 in aperture 13.

Whenever one part and/or bar is connected to another, although no specific connecting means are shown or described, it can be considered that they are connected by any suitable connecting means.

I claim:

1. A loading device for a truck having a driver's cabin and an open tender in back of the driver's cabin, the driver's cabin having a back wall and the open tender having side walls and a back wall, said loading device comprising:

a front bow of inverted U shape extending parallel to and immediately in back of the driver's cabin back wall between the side walls of the open tender, said front bow comprising left and right fixed bars forming the sides of the inverted U shape and a rotatable bar forming the apex of the inverted U shape, said rotatable bar being hollow and extending horizontally substantially the width of the driver's cabin, said fixed bars each having an upper end inserted into an end of said rotatable bar and a lower end opposite said upper end;

a plate affixed to said rotatable bar, said plate being rotatable approximately 270° with said rotatable bar between a substantially vertical position in back of the driver's cabin between said fixed bars and a substantially horizontal position over the driver's cabin;

stopping means for stopping rotation of said rotatable bar and said plate at said substantially vertical position and said substantially horizontal position;

a back bow of inverted U shape parallel to and positioned rearwardly of said front bow and extending between the side walls of the open tender, said back bow having left and right side portions forming the sides of the inverted U shape and an upper horizontal portion forming the apex of the inverted U shape, said side portions each having a lower end; and left and right lower bars extending respectively between said lower ends of said left fixed bar and said left side portion and between said lower ends of said right fixed bar and said right side portion, said left and right lower bars being connectable to the side walls of the open tender.

2. The loading device of claim 1, wherein said rotatable bar has a circumferential slot formed therein at one end extending approximately 270° corresponding to the range of angular movement of said plate between said substantially vertical position and said substantially horizontal position; and wherein said stopping means comprises a box-like part affixed to said upper end of one of said fixed bars in alignment with said slot, said box-like part extending at least flush with said rotatable bar.

3. The loading device of claim 1, wherein said plate is in the form of a frame.

4. The loading device of claim 1, further comprising wires subdividing said frame.

5. The loading device of claim 1, wherein said back bow is movable parallel to said front bow.

6. The loading device of claim 1, further comprising removable upper bars extending between said front and back bows.

* * * * *